United States Patent [19]

Schneider

[11] Patent Number: 4,510,587

[45] Date of Patent: Apr. 9, 1985

[54] METHOD AND ARRANGEMENT FOR THE EVALUATION OF SIGNALS FROM AN ULTRASONIC DISPLACEMENT PATH MEASURING SYSTEM

[75] Inventor: Otto Schneider, Gränichen, Switzerland

[73] Assignee: Maag Gear-Wheel & Machine Company Limited, Zürich, Switzerland

[21] Appl. No.: 435,328

[22] Filed: Oct. 19, 1982

[30] Foreign Application Priority Data

Oct. 30, 1981 [CH] Switzerland .......................... 6933/81

[51] Int. Cl.³ .......................... G01B 7/14; G01B 17/00
[52] U.S. Cl. .................................... 367/118; 324/208; 367/89; 367/96; 367/108; 367/902
[58] Field of Search .................. 367/95, 96, 108, 118, 367/127, 89, 902; 324/207, 208

[56] References Cited

U.S. PATENT DOCUMENTS 4,028,619  6/1977  Edwards .............................. 324/208

Primary Examiner—Richard A. Farley
Attorney, Agent, or Firm—Werner W. Kleeman

[57] ABSTRACT

The method and arrangement contemplates transmitting externally triggered trigger pulses by means of a magnetostrictive line or conductor and such produces echo pulses. Displacement path and time oscillator pulses are counted by two counter groups, and there is computed from the counter state the velocity-corrected position of a measuring head. Consequently, with a higher measuring rate there can be appreciably increased the accuracy of the evaluation of the pulses delivered by the ultrasonic measuring system, there can be obtained further measuring data (velocity and acceleration) by means of the moving measuring head, and there is possible an absolute measurement. Additionally, the resolution of the measured displacement path or distance can be randomly selected by means of the frequency of the displacement path or distance oscillator.

9 Claims, 7 Drawing Figures

METHOD AND ARRANGEMENT FOR THE EVALUATION OF SIGNALS FROM AN ULTRASONIC DISPLACEMENT PATH MEASURING SYSTEM

BACKGROUND OF THE INVENTION

The present invention relates to a new and improved method and apparatus for the evaluation of signals from an ultrasonic displacement path or distance measuring system, especially for machine tools.

Generally speaking, the method and arrangement of the present development is of the type wherein there is provided a magnetostrictive line or conductor along which there can be displaced a measuring head containing permanent magnets and by means of which there are transmitted trigger pulses. These trigger pulses, in each case, set a flipflop and lead to echo pulses in the permanent magnets which reset the flipflop and are received by a stationary receiver of the measuring system. Within a signal transit or travel time, referred to herein as the transit time pulse, in other words, within the time between each trigger pulse and the received echo pulse there are counted, in a displacement path or distance counter, the pulses generated by a displacement path or distance oscillator as a measure for the distance or displacement path between the permanent magnets and a fixed reference point.

Such type of ultrasonic distance or displacement path measuring system is known, for instance, from U.S. Pat. No. 3,898,555, granted Aug. 5, 1975. With this distance measuring system an oscillator generates trigger pulses having a fixed frequency for the relevant magnetostrictive line or conductor and dependent upon its length, such frequency fluctuating between 8,000 Hz for short conductors or lines and 2,000 Hz for long conductors or lines. This fixed trigger pulse cycle is disadvantageous, because it fixes a predetermined measuring rate which cannot be enlarged. Also if the echo pulse appears briefly after the trigger pulse, because the measuring head is located at a slight distance from the receiver of the measuring system, then it is necessary to wait with the next trigger pulse by an amount of time governed by the clock frequency of the oscillator before there can be undertaken a new measurement. Moreover, the resolution with this state-of-the-art ultrasonic distance or displacement path measuring system is governed by the frequency of the distance or displacement path oscillator, since the greater the number of displacement path-oscillator pulses counted during a transit time pulse, that much greater is the resolution. If there is strived for an exceptionally high resolution, then there are quickly reached displacement path-oscillator frequencies which no longer can be processed. Finally, the prior art ultrasonic distance measuring system is only suitable for measuring the position of a stationary measuring head. If this measuring head were to move, then because of the finite propagation velocity of the ultrasonic echo pulse, amounting to approximately 2,800 m/s, there would be caused an error rendering impossible the use of the system with precision machine tools, for instance with large gear grinding machines.

Furthermore, there are known to the art from German Patent Publication No. 2,833,369, published Feb. 7, 1980, a method and arrangement for the incremental measuring of the relative position of two objects by means of ultrasonic waves, which afford a greater accuracy than the known ultrasonic distance measuring system in that, here, the phase between an alternating-current voltage, serving to generate the ultrasonic wave in the magnetostrictive conductor or line, and an alternating-current voltage induced in the receiver by the ultrasonic wave, is employed as a measure for the relative position of the receiver with respect to the transmitting measuring system. The evaluation technique is not dependent upon the amplitude of the transmitted trigger pulse and the received echo pulse. However, this method is afflicted with the shortcoming that there are not possible any absolute measurements.

SUMMARY OF THE INVENTION

Therefore, with the foregoing in mind it is a primary object of the present invention to provide a new and improved method and arrangement for the evaluation of signals from an ultrasonic linear distance or displacement path measuring system which is not afflicted with the aforementioned drawbacks and limitations of the prior art proposals.

Another and more specific object of the present invention is directed to a new and improved method and arrangement of the character described which enables, with a simultaneously greater measuring rate, appreciably increasing the accuracy of the evaluation of the pulses delivered by the ultrasonic measuring system, and additionally, enables obtaining further measuring data by means of the moving measuring head and allows for an absolute measurement.

Now in order to implement these and still further objects of the invention, which will become more readily apparent as the description proceeds, the signal evaluation method of the present development is manifested by the features that:

(a) the trigger pulses are externally triggered;
(b) there are counted in addition to the distance or displacement path-oscillator pulses counted during a transit time pulse the pulses of a time oscillator between a first trigger pulse and a second trigger pulse by means of a time counter;
(c) there are counted by means of a further distance or displacement path counter the pulses of the distance or displacement path oscillator during the next transit time pulse and by means of a further time counter there are counted the pulses of a time oscillator between the second trigger pulse and a third trigger pulse;
(d) there are computed from the determined counter states:
(i) the position of the measuring head $$XG_n = NX_n \cdot \Delta x$$

wherein:
n = the last of a plurality of transit time pulses
$XG_n$ = the measured position value after n-transit time pulses
NX = the number of distance or displacement path counter pulses within a transit time pulse $\Delta x$ = distance or displacement path increment =

$$V_L/f_W = \frac{\text{ultrasonic propagation velocity}}{\text{distance oscillator frequency}}$$

(ii) the mean velocity of the measuring head $$V_n = \frac{\Delta x}{\Delta t} \cdot \frac{NX_n - NX_{n-1}}{NT_n}$$

wherein:
- $V_n$ = the velocity of the measuring head after n-transit time pulses
- $\Delta t$ = the time increment = $1/f_T$ = 1/time oscillator frequency
- $NT_n$ = number of time counter pulses between the $(n-1)$ and the n-th trigger pulse; and (iii) a velocity-correction term for the position $XG_n$ of the measuring head computed during step (i)

$$XV = V_n \cdot T_{Ln} = V_n \cdot (NX_n / f_W)$$

wherein: $T_L$ = the time duration of the n-th transit time pulse; and (e) delivering as the evaluation result the velocity-correct measuring head position $$XA = XG + XV$$

and/or the mean measuring head velocity V.

As alluded to above, the invention is also concerned with an arrangement for performing the inventive method, and which is manifested by the features that:

a counter group comprises a distance or displacement path counter connected with a displacement path oscillator and a time counter connected with a time oscillator;

a further counter group comprises a further distance or displacement path counter connected with the displacement path oscillator and a further time counter connected with the time oscillator;

a counter switching logic is connected with the measuring system and is controlled by the trigger and echo pulses for switching-in one counter group during each transit time pulse, for stopping the distance or displacement path counter of such group in the presence of the related echo pulse and the time counter of this group during the next trigger pulse and for the simultaneous switching-in of the other counter group; and a computer is connected with the counter switching logic and the counter groups for triggering the trigger pulses, controlling the counter switching logic and for evaluation of the counter states.

Whereas with the known ultrasonic distance or displacement path measuring system the trigger pulse oscillator delivers trigger pulses having a fixed clock frequency, which governs a predetermined measuring rate, with the method of the present development the trigger pulses are externally triggered. This renders possible the renewed generation of a trigger pulse immediately after the occurrence of an echo pulse. The method and arrangement of the invention are designed in such a manner that there is possible a universal operation of the measuring system, i.e. there can be used both a fixed measuring cycle (synchronous) and also a variable measuring cycle (asynchronous). With this method and arrangement it is possible to determine, apart from the position value, also the velocity and the acceleration of the measuring head, and for which reason there is always used, apart from a distance or displacement path counter, also a time counter which measures the time between two successive measurements, i.e. the time interval between two trigger pulses. As explained, the arrangement contains two counter groups each composed of a distance or displacement path counter and a time counter. The switching from one counter group to the other counter group is accomplished automatically by the counter switching logic. For this purpose, the counter switching logic or logic circuit is controlled by the external triggering of the trigger pulses as well as by the echo pulses corresponding thereto. The resolution of the measured displacement path or distance, with the arrangement and method of the invention, is randomly selectable by means of the frequency of the distance or displacement path oscillator (the resolution, i.e., a small distance or displacement path increment, is constituted by the quotient of the propagation velocity of the ultrasonic echo pulse and the distance or displacement path oscillator frequency).

The counter contents delivered by both counter groups are processed by the computer causing the external triggering of the counter switching logic in order to compute the position, the velocity and the acceleration of the measuring head, this computer also furnishing the corresponding measuring or measurement result.

The time required by an ultrasonic pulse to move through a predetermined path or distance at the magnetostrictive conductor is dependent upon its ferromagnetic properties, such as for instance density, temperature coefficient, modulus of elasticity, magnetic permeability. These properties can vary at one conductor from one location thereof to another or from one conductor to another conductor.

Thus the measured position $XG_n$ of the measuring head is corrected by the following linearity-correction term $XL_{(n)}$ which takes into account the non-linearity of the magnetostrictive conductor:

$$XL_{(n)} = (NX_{(n)} \cdot \Delta x) - X_{REF(n)} + (NX_A \cdot \Delta x)$$

wherein $$\Delta x = \frac{X_{REF}}{\frac{\sum_{i=1}^{i} NX_{E(i)}}{i} - \frac{\sum_{i=1}^{i} NX_{A(i)}}{i}}$$

and wherein:
- $XL_{(n)}$ = distance or displacement path difference between the measurement with a laser interferometer and ultrasonic measuring system at the measuring point $P_n$
- $NX_A$ = start of the magnetostrictive conductor
- $NX_E$ = end of the magnetostrictive conductor
- $X_{REF}$ = distance or path $\overline{X_A X_E}$ measured by the laser interferometer
- $NX_{E(i)}$ = number of distance or displacement path-counter pulses with one of i-measurements at the start of the conductor.
- $NX_{A(i)}$ = number of distance or displacement path-counter pulses with one of i-measurements at the end of the conductor
- $NX_{(n)}$ = number of distance or displacement path-counter pulses measured by the ultrasonic measuring system at the measuring point $P_n$ between $NX_A$ and $NX_E$
- $X_{REF(n)}$ = distance measurement at the measuring point $P_n$ of the laser interferometer.

With this feature of the invention there is therefore corrected the measured position of the measuring head by means of the linearity-correction term $XL_{(n)}$ which takes into account the non-linearity of the magnetostrictive conductor or line, in order to further prove the accuracy. This linearity correction term is thus determined at the object to be measured, i.e., in the finally installed condition of the measuring system in that, for instance, there is accomplished at the object to be measured, for instance a gear grinding machine, a calibration of the arrangement by means of an accurate measuring system, for instance a laser interferometer.

According to a further feature of the invention the position $XG_n$ of the measuring head is corrected with a temperature-compensation factor $$TFX_{(T)} = NX_{(20^\circ C.)}/NX_{(T)}$$

wherein, there is assumed the value 1 for a temperature of 20° C. and which can be computed ahead of time by means of a number of measurements at other temperatures. Thus, the position of the measuring head is additionally corrected by means of the temperature-compensation term $TFX_{(T)}$, whereby there is further improved the measuring accuracy upon employment of the measuring system in environments having markedly different temperatures.

According to a further feaure of the method of the invention, the position $XG_n$ of the measuring head is corrected by a correction term XO which takes into account the deviation between the null position of the measuring head and the receiver. Accordingly, the position of the measuring head is corrected with respect to the different null points of the objects to be measured and the measuring system, so that at the end there can be delivered the position values related to the null point of the object to be measured, i.e., for instance in the case of a gear grinding machine to exact position of the measuring head connected with the grinding wheel support with respect to the machine null point.

The method further contemplates delivering the corrected position XA of the measuring head, wherein $$XA = XG \cdot TFX + SV + SL + XO.$$

With this feature of the invention there can be delivered a position measuring value which is corrected with respect to the temperature of the measuring environment, the viscosity of the measuring head during the measurement, the non-linearity of the magnetostrictive conductor, and the different null points between the measuring system and measuring object.

The method of the invention further contemplates that following step (c) there are accomplished pulse counts like in step (b) and there is computed from the counter states determined during three counting intervals the acceleration $A_n$ of the measuring head, namely:

$$A_n = 2 \cdot \frac{V_n - V_{n-1}}{(NT_n + NT_{n-1})\Delta t}.$$

With this feature of the invention there can be determined the acceleration of the measuring head for acquiring further data or information. This data in conjunction with the position and the velocity data advantageously can be used as a feedback magnitude in a regulation circuit in which the measuring head is connected, for instance, with a carriage, the position of which should be regulated. A regulation operation is that much more stable the more feedback magnitudes can be taken into account thereat.

According to a further aspect of the invention, the arrangement thereof contains a control logic connected with the counter switching logic and with the computer by means an interface. This control logic delivers to the computer the status of a counter group holding in readiness the measuring data. Specifically, the control logic transmits to the computer control signals concerning which counter group is holding in readiness measuring data for evaluation. The interface enables, with the aid of the course of the program in the computer, triggering measurements and processing the measuring data.

After a measurement, i.e. between a trigger pulse and the next trigger pulse, there cannot yet be determined whether the measuring head has moved and whether there is required a velocity correction for the measured position of the measuring head. Therefore, by means of the other counter groups there is accomplished at least one further measurement between two trigger pulses, and then based thereon there is determined in the described manner a velocity-corrected position measuring value, with the result that there is appreciably increased the position measuring accuracy.

Furthermore, the arrangement of the invention can be designed such that there is provided, apart from the control logic, an interruption or interrupt logic for interrupting the course of the program in the computer when there is available measuring data for elevuation. In this way there can be improved the dynamics of the measuring rate, because the interruption or interrupt logic interrupts the program or program cycle in the computer after each measurement, so that such assumes the evaluation of the measuring data and at the same time immediately performs a new measurement.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
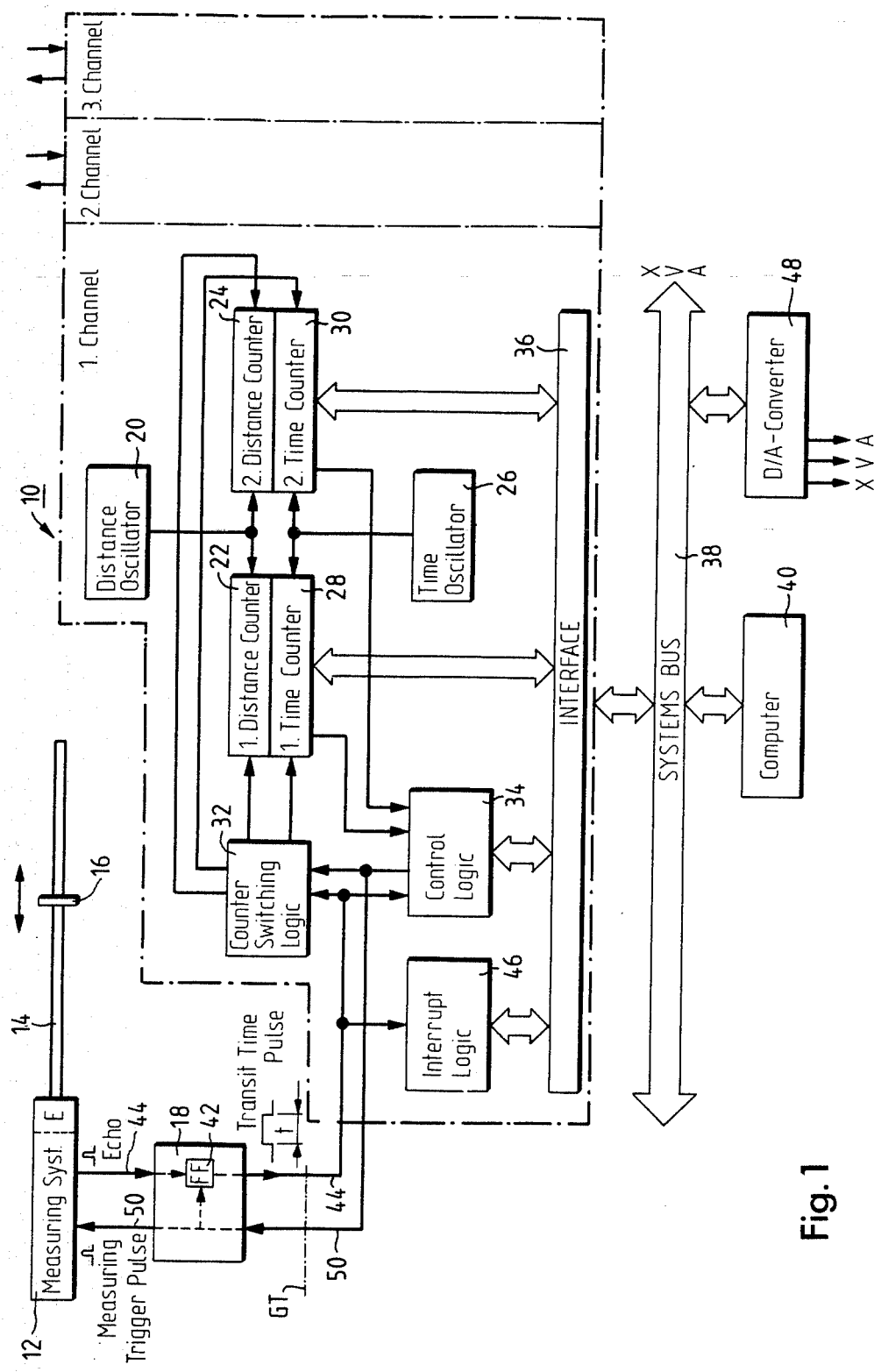
FIG. 1 is a block circuit diagram of an arrangement according to the invention.

Describing now the drawings, in FIG. 1 there has been depicted, by way of example and not limitation, an exemplary embodiment of arrangement for processing and evaluation of signals, and which arrangement has been generally designated in its entirety by reference numeral 10. This arrangement is operatively correlated with a conventional ultrasonic distance or displacement path measuring system 12, also sometimes briefly referred to as a path measuring system. The mode of operation of such ultrasonic distance measuring system 12 is predicated upon the principle of magnetostriction for certain ferromagnetic materials. The measuring magnitude is the transit or travel time of an ultrasonic pulse between two points at a magnetostrictive conductor or line 14, which here simply has been conveniently illustrated in the form of a rod. At one end of the conductor 14 there is located a not particularly illustrated but conventional electronic transmitter and an electronic receiver E. Along the conductor 14 there is displaceably arranged a measuring head 16 which possesses a permanent magnet or magnet means. If a trigger pulse is transmitted by the transmitter through the conductor 14, then there travels together with such pulse a circular-shaped magnetic field along the wire or conductor 14. This magnetic field impinges at the longitudinal magnetic field of the permanent magnet, so that for the duration of the trigger pulse there is generated in the conductor 14 a torsion effect which produces an ultrasonic pulse which is received as an echo pulse by the receiver E. If there is measured the time or time interval between the trigger pulse and the received echo pulse, then this time interval constitutes a measure for the linear distance or displacement path—also sometimes simply referred to as the path or distance—between the permanent magnet and the receiver E. For outputting an analog signal it is possible to convert the distance-proportional time interval into a direct-current voltage of a predetermined amplitude, whereas for the output of a digital signal during the time between the trigger pulse and the echo pulse there can be counted the pulses generated by a distance or displacement path oscillator 20—also sometimes briefly referred to herein as path or distance oscillator—and such can be converted at a suitable numerical display (not shown).

The arrangement 10 contains the distance or path oscillator 20 which delivers pulses at a high clock frequency, for instance 125 MHz. These pulses are inputted to a first distance or displacement path counter 22 and a second distance or displacement path counter 24, also sometimes simply referred to as path or distance counters. Additionally, the arrangement 10 contains a time oscillator 26 which likewise delivers pulses at a high clock frequency. These pulses are inputted to a first time counter 28 and a second time counter 30. These four counters 22, 24, 28 and 30 are connected with a counter switching logic or logic circuit 32 which controls the counters 22, 24, 28 and 30 such that always one counter group, for instance the first distance counter 22 and the second time counter 30 count distance oscillator pulses and time oscillator pulses, respectively, whereas the other counter group, i.e. the first time counter 28 and the second distance counter 24 are stopped, and vice-versa; in other words, the second counter group counts pulses, whereas the other counter group is stopped. The counter switching logic 32 is coupled with a control logic or logic circuit 34 which receives by means of an interface 36 and a systems bus 38, trigger pulses from a computer 40 which, in each case, trigger a measuring operation. The control logic 34 delivers the trigger pulses to the counter switching logic 32 and by means of an infeed line 50 to an input stage 18 of the measuring system 12 and to a flipflop 42 contained in the receiving stage 18. A feedback or return line 44 leads from the measuring system 12 by means of the flipflop 42 to the counter switching logic 32 and the control logic 34. The flipflop 42 is always set by one trigger pulse and is reset by the echo pulse corresponding thereto and which is received by the receiver E, so that the flipflop 42 delivers a transit time pulse which starts with the trigger pulse and terminates with the echo pulse. This transit time pulse likewise controls the counter switching logic 32 which turns-on a counter group at the start of each transit time pulse and stops the time counter of the other counter group, whose distance or displacement path counter is stopped by the end of the transit time pulse, i.e., by the echo pulse.

Connected with the return line 44 at the output of the flipflop 42 is an interruption or interrupt logic 46 which acts by means of the interface 36 and the systems bus 38 upon the computer 40 in a manner which will be more fully described hereinafter. Furthermore, there are also provided connections or leads between both of the time counters 28 and 30 and the control logic 34 as well as the interface 36 which are of significance for the synchronous operation of the arrangement, and which will be likewise considered more fully at a later point of this disclosure.

The arrangement 10 constitutes a measuring channel which possesses its own measuring system. As has been indicated with broken lines in FIG. 1, there can be provided still further measuring channels which then each possess their own measuring system and work with the same computer 40. In this case, there would only then be necessary a certain priority correlation, in order that the individual measuring channels are serviced by the computer 40 in accordance with the importance or priority of the measuring data delivered by the measuring channels.

By means of the systems bus 38 the measuring data can be directly outputted in the form of digital signals. For the case that the output signals are desired in analog form there is provided a digital-to-analog converter 48 (D/A-converter) which delivers the measuring signals X (measuring head position), V (measuring head velocity) and A (measuring head acceleration).

The input stage 18 containing the flipflop 42 is arranged at the direct neighborhood of the measuring system 12, so that there are provided therebetween conductors or lines of negligible length. Between the input stage 18 and the arrangement 10 there is provided at the lines or conductors 44 and 50 a galvanic decoupling at a location GT by means of an inductive coupler. This renders possible connecting the arrangement 10 with the input stage 18 by means of a cable length of 50 meters or 150 meters, without thereby influencing the transit time pulse length.

Figure 2:
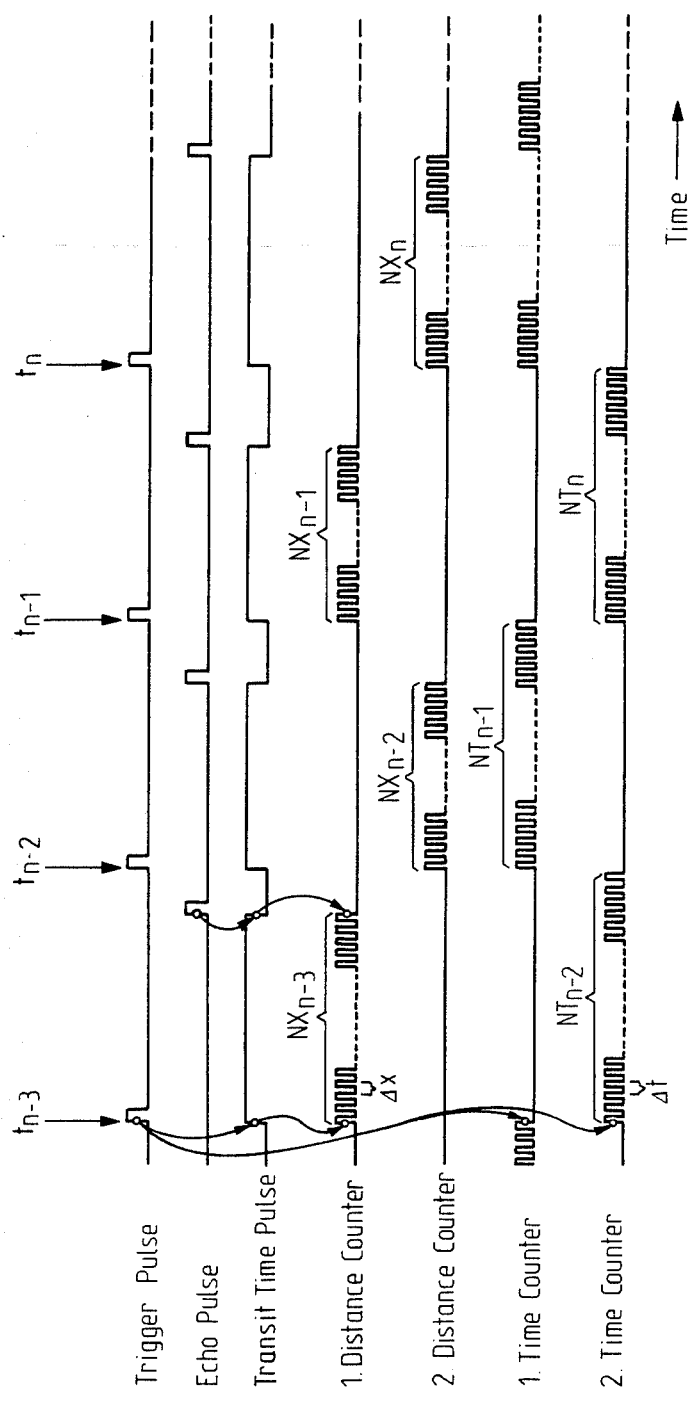
FIG. 2 is a pulse diagram depicting the mode of operation of the arrangement illustrated in FIG. 1.

The mode of operation of the entire arrangement depicted in FIG. 1 will now be described in greater detail with reference to the pulse diagrams depicted in FIG. 2. If the control logic 34 or, in the here described case, the computer 40 as the external trigger source delivers a trigger pulse by means of the infeed line 50 to the flipflop 42 and the measuring system 12, at the time $t_{n-3}$, then there is simultaneously also activated the counter switching logic 32 which, in the illustrated example of FIG. 2, turns on the second time counter 30 and stops the first time counter 28. Additionally, by means of the line or conductor 50 there is set the flipflop 42, so that there is started the transit time pulse, the positive going flank of which turns on, by means of the line 44, the first distance or path counter 22. Upon appearance of the echo pulse which is transmitted back by the measuring head 16 the flipflop 42 is reset and the first distance or path counter 22, which has counted the pulses emanating from the distance or path oscillator 20 during the total transit time pulse, is stopped. During this time the second time counter 30 continues to run until the appearance of the next trigger pulse, which occurs at the time $t_{n-2}$.

Upon appearance of the second trigger pulse the second time counter 30 is stopped and there is turned on the first time counter 28 and by means of the forward and return line to the flipflop 42 there is turned on the second distance or path counter 24, which then counts the distance oscillator pulses until the appearance of the next echo pulse and the time oscillator pulses until the appearance of the third trigger pulse, which occurs at the time $t_{n-1}$.

Upon appearance of the third trigger pulse there is again stopped the first time counter 28 and there is turned on the second time counter 30 as well as the first distance or path counter 22 by means of the forward and return line to the flipflop 42.

During the now running third transit time pulse the first distance counter 22 counts the distance oscillator pulses until the appearance of the next echo pulse, whereas the second time counter 30 counts the time oscillator pulses until the appearance of the fourth trigger pulse, occurring at time $t_n$, and so forth.

This method renders possible computing a mean velocity between two position measurements independent of the measurement trigger cycle.

The velocity computation can be used as measuring data, for instance, in a regulation circuit as further feedback magnitude, or, however, for velocity correction of the position measurement which is important in the here described embodiment of a moving measuring head.

The computer 40 computes from a position measurement the position of the measuring head in accordance with the following relationship:

$$XG_n = NX_n \cdot \Delta x$$

wherein:
n = the last of a plurality of transit time pulses
$XG_n$ = the measured position value after n-transit time pulses
NX = the number of distance or displacement path counter pulses within a transit time pulse $\Delta x$ = distance or displacement path increment =

$$V_L/f_W = \frac{\text{ultrasonic propagation velocity}}{\text{distance oscillator frequency}}.$$

Figure 3:
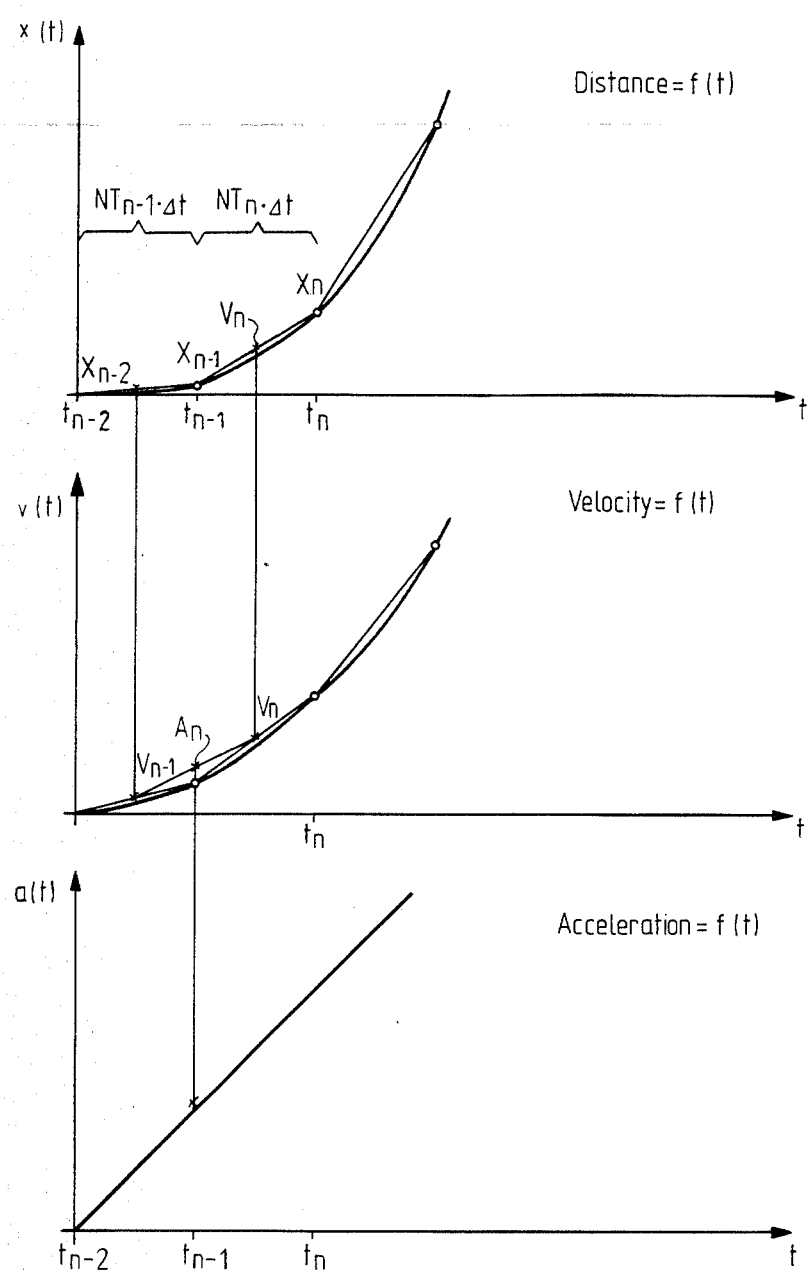
FIG. 3 illustrates various graphs for explaining the computation method.

Then the computer computes from two position measurements a mean velocity of the measuring head, i.e., its velocity between two distance or displacement path measurements, in accordance with the two upper diagrams X(t) and V(t) illustrated by way of example in FIG. 3 and in accordance with the following equation:

$$V_n = \frac{\Delta x}{\Delta t} \cdot \frac{NX_n - NX_{n-1}}{NT_n}$$

wherein:
$V_n$ = the velocity of the measuring head after n-transit time pulses
$\Delta t$ = the time increment = $1/f_T$ = 1/time oscillator frequency
$NT_n$ = number of time counter pulses between the (n−1) and the n-th trigger pulse.

If the previously computed velocity $V_n$ is not equal to null, then this means that the measuring head has moved and that the computed position of the measuring head still must be corrected by a velocity correction term XV, which is accomplished in accordance with the following equation:

$$XV = V_n \cdot T_{Ln} = V_n \cdot (NX_n/f_W)$$

wherein: $T_L$ = the time duration of the n-th transit time pulse.

As the evaluation result there is then outputted by the computer 40 the velocity-corrected measuring head position $$XA = XG + XV.$$

Additionally, or instead there is outputted the computed mean measuring head velocity V, which, for instance, can be used in a regulation circuit as a feedback magnitude, as will be more fully explained hereinafter with reference to FIG. 5.

In addition there is then still corrected the computed position $XG_n$ of the measuring head by means of a linearity-correction term $XL_{(n)}$ which takes into account the non-linearity of the magnetostrictive conductor. Additionally, there is undertaken a temperature compensation and a correction with respect to the deviation between the null point of the measuring system and the null point of a machine or the like with which there is coupled the measuring head 16.

As to such corrections, which will be more fully explained hereinafter, there are used the symbols hereinafter defined:

N: number of counter pulses
NX: number of distance or displacement path counter pulses
NT: number of time counter pulses
$\Delta x$: distance or displacement path increment (distance information of a distance counter pulse)
$\Delta t$: time increment (time information of a time counter pulse)
XG: measured position value
XV: velocity-dependent correction-position value
XL: linearity-dependent correction-position value
XO: position value deviation due to difference between null position of the measured object and null position of the measuring system
XA: output value position
VA: output value velocity
AA: output value acceleration
$f_T$: frequency of the time oscillator
$f_L$: frequency of the distance oscillator
$V_U$: propagation velocity of the ultrasonic wave
$T_L$: time duration of the transit time pulse Determination of the Distance or Displacement Path Increment $\Delta x$:

Considered strictly from the physical aspects the distance or displacement path increment is defined by the relationship:

$$\Delta x = V_U/f_w$$

Figure 4A:
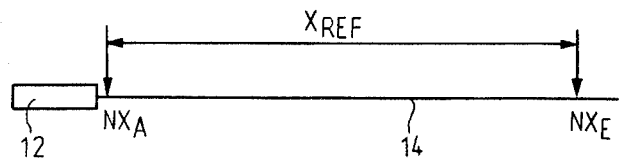
FIGS. 4a, 4b and 4c are graphs serving for explaining the determination of the linearity-correction term and the temperature compensation factor.

Since, however, the propagation velocity is not exactly the same in different measuring systems there is determined the distance or path increment according to the scheme depicted in FIG. 4a. A number of measurements are undertaken at the start $NX_A$ of the conductor and at the end $NX_E$ of the conductor with the aid of the measuring system and the evaluation arrangement. By means of a laser interferometer there is exactly measured the distance or path $X_{REF}$ between the start $NX_A$ and the end $NX_E$ of the conductor. The distance or path increment $\Delta x$ is then defined in the following manner:

$$\Delta x = \frac{X_{REF}}{\frac{\sum_{i=1}^{i} NX_{E(i)}}{i} - \frac{\sum_{i=1}^{i} NX_{A(i)}}{i}}$$

Figure 4B:
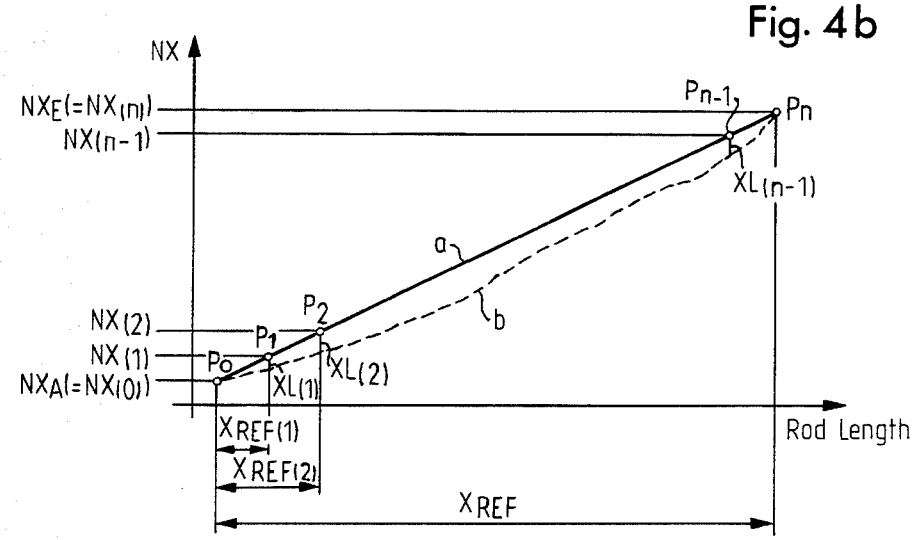

The values $NX_E$ and $NX_A$ are likewise used for the determination of the linearity-correction values, and specifically, according to the diagrams depicted in FIG. 4b, wherein the curve a is obtained by a measurement with the ultrasonic measuring system and the evaluation arrangement, whereas the curve b is obtained by a measurement with the laser interferometer.

At a fixed distance between $NX_A$ and $NX_E$ there are undertaken measurements with the ultrasonic measuring system and the evaluation arrangement as well as with the laser interferometer. The correction value $X_L$ which is to be correlated to the measuring points $P_n$ can be determined by the following equation:

$$XL_{(n)} = (NX_{(n)} \cdot \Delta x) - X_{REF(n)} + (NX_A \cdot \Delta x)$$

wherein, $NX_A \cdot \Delta X$ is assumed to be "scale-null", whereas $X_{REF(n)}$ is the value obtained by the laser measurement at the measuring point $P_n$. What is important is that the linearity-correction value is determined in the assembled state of the measuring system.

The transit time pulse produced by the ultrasonic measuring system is temperature-dependent. During the employment of the measuring system in an environment where there can arise pronounced temperature fluctuations there is thus provided a temperature compensation. This is introduced as follows in the computation $$XG_n = NX_n \cdot \Delta x \cdot TFX.$$

Figure 4C:
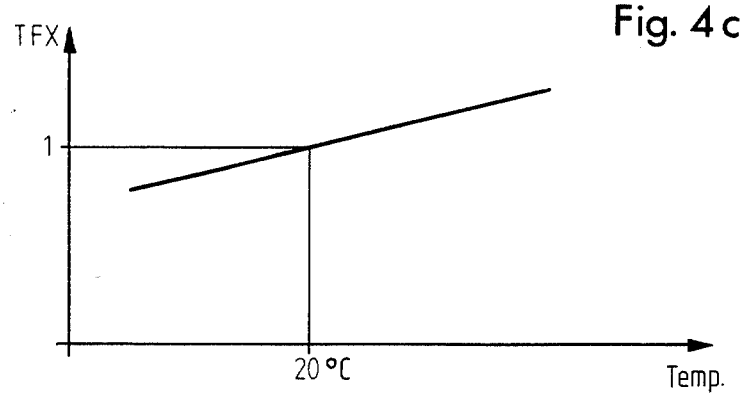

With increasing temperature the propagation velocity of the ultrasonic wave increases and the transit time of the echo pulse decreases. The course of the temperature compensation factor TFX as a function of the temperature is determined by measurements (cf. example of FIG. 4c). Here there is valid the following definition:

$$TFX_{(T)} = NX_{(20° C.)} / NX_{(T)}$$

and $$TFX_{(20°)} = 1.$$

In practice the term TFX is pre-computed along with $\Delta x$, so that the processing time of the computation routines and the computer are not influenced. The temperature measurement during use of the equipment is accomplished at the magnetostrictive conductor 14 itself with the aid of a not particularly illustrated measuring field.

While taking into account the previously defined correction values there is then outputted as the corrected position XA of the measuring head by the arrangement the following function:

$$XA = XG \cdot TFX + XV + XL + XO.$$

Finally, the here described arrangement also enables, based upon three position measurements, computing the acceleration of the measuring head in accordance with the diagrams of FIG. 3 according to the following equation or relationship:

$$A_n = 2 \cdot \frac{V_n - V_{n-1}}{(NT_n + NT_{n-1}) \Delta t}.$$

The evaluation arrangement therefore enables computing and indicating the position, corrected or uncorrected, depending upon requirements and the speed of the measuring head, the velocity and the acceleration of the measuring head, based upon the data determined during the measurements by the distance or path counters and the time counters.

Figure 5:
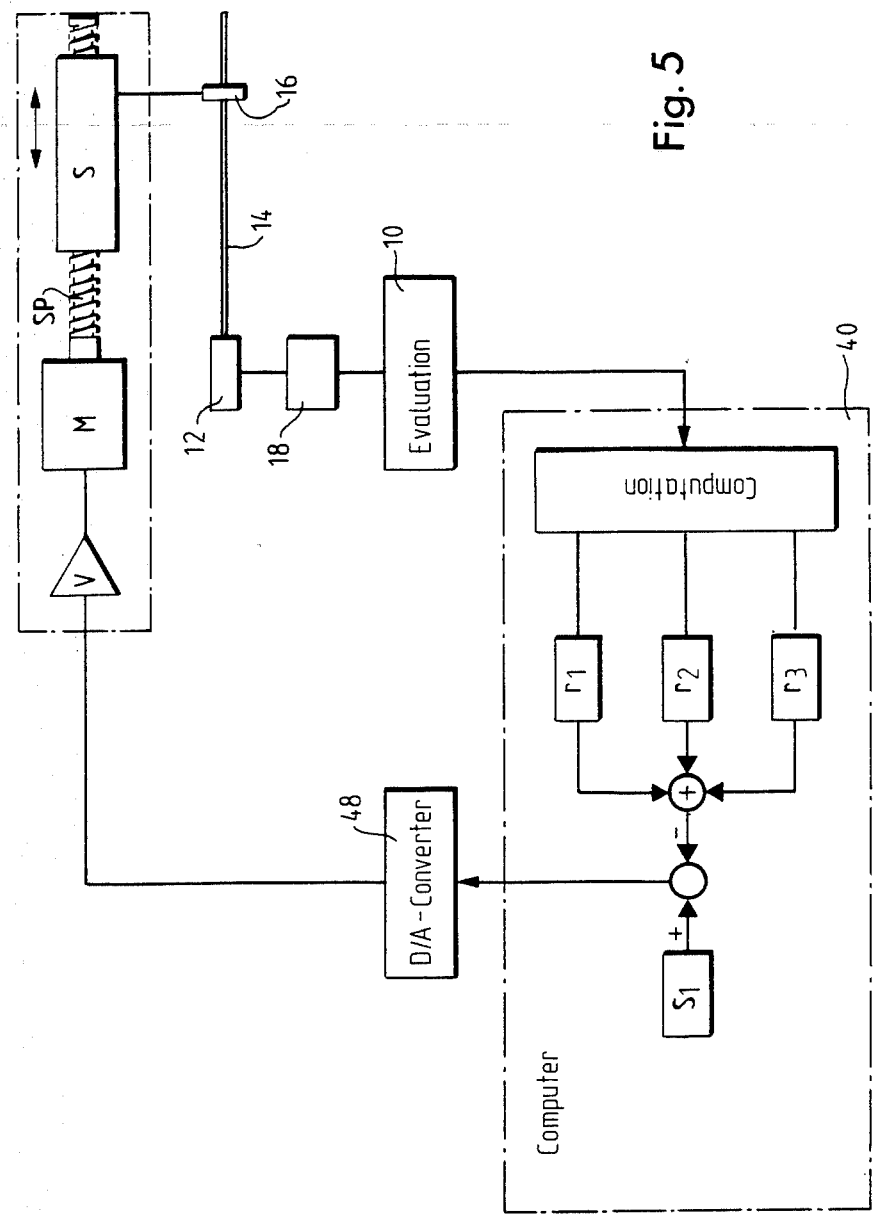
FIG. 5 is a block circuit diagram illustrating an example for the use of the arrangement depicted in FIG. 1 in a regulation circuit.

The results furnished by the evaluation arrangement can be employed, for instance, in a regulation circuit in the manner indicated in FIG. 5. Quite generally, the properties of a regulated system can be appreciably improved by the feedback of further conditions. While the measurement of such further conditions usually is impossible in a regulation loop, which explains why such must be estimated or determined with the aid of a model, a procedure which is extremely time-consuming and complicated, the here described evaluation arrangement, apart from the position feedback, allows in a most simple manner also the feedback of velocity and acceleration conditions or states. The example depicted in FIG. 5 illustrates as the regulation loop an amplifier V, which powers a drive motor M which drives a spindle SP which adjusts a carriage or slide S which is connected with the measuring head 16. The computer 40 receives the measuring data, in the manner described previously with reference to FIG. 1, computes therefrom the position, the velocity and the acceleration, scales such by means of the feedback coefficients $r_1$, $r_2$ and $r_3$, respectively, groups such together in an adding or summation element into an actual value which is compared in a comparator with a set or reference value $S_1$ which is likewise delivered by the computer 40, and the difference constitutes the adjustment or positioning magnitude which is then inputted by means of the D/A-converter 48 to the regulation loop.

The control logic 34 provided in the arrangement of FIG. 1, not only controls the counter switching logic 32 by means of the signals obtained from the computer 40, but also transmits to the computer 40 operating condition or state signals which, for instance, indicate which counter group of which measuring channel (if a plurality of measuring channels are connected with the computer) contain in readiness measuring data for further processing. The interrupt logic 46 which is provided enables, after each measurement, interrupting the course of the program in the computer 40, so that the computer 40 immediately occupies itself with the processing of the signals delivered by the arrangement 10. In this way it is possible to appreciably increase the dynamics of the measuring rate, because with corresponding short transit time pulses the measuring data can be correspondingly earlier processed and there can be immediately transmitted a new trigger pulse by means of the conductor 14. The software is designed such that it manages the data flow between the arrangement 10 and the computer 40, and thus, renders possible a synchronous measuring operation with or without interruption as well as an asynchronous measuring operation with or without interruption. In both operating modes there are continuously processed by the computer 40 the measuring data delivered by the arrangement 10.

If the arrangement operates in the synchronous mode, i.e., works in real time, then the computer 40 delivers a fixed clock or cycle, so that there are produced equidistant trigger pulses. The evaluation is then extremely simple because the time counter data no longer need be retrieved by the computer 40. The fixed clock or cycle between the measuring resolutions, in this case, produces a constant time information or data.

During the asynchronous mode the use of the interruption or interrupt logic 46 is of extreme importance, because in this case the trigger pulses are transmitted at different intervals or spacings by means of the conductor 14. If during a measurement there results a shorter transit time pulse, then there is correspondingly begun at an earlier time the next measurement. In order to be able to make optimum use of this characteristic there is beneficially employed the interrupt logic 46.

The computer 40 can concern itself with any desired procedures in a main program. If a measurement has been completed then the interrupt logic 46 interrupts the course of the main program, and the program counter immediately jumps into the ultrasonic data processing routine which triggers a new measurement and processes the available data. Thereafter, there is accomplished the return back into the main program at the point where there previously occurred the jump-off.

All of the measuring channels are always connected with the interrupt logic 46. The processing sequence of a number of measuring channels can be randomly selected and changed at any time by means of priorities which are set or allocated by the computer in the interrupt logic.

With a number of measuring systems there also could be selected a hybrid operation.

Of course, it is possible to work without an interrupt logic 46, because the computer 40 interrogates the status of the arrangement 10 by means of the control logic 34. By virtue of its direct connection with the time counters 28 and 30, as has been illustrated in FIG. 1, such is always informed about their status which always indicates which counter group of which measuring channel is holding in readiness measuring data. Of course, in this case the measuring rate is reduced because in the main program there must be periodically interrogated the status.

In FIG. 3 there has been portrayed as an example a sequence from a linear accelerated movement a(t) in order to indicate the computation of the individual discrete values.

For the sake of simplicity there has been assumed a constant sampling time or trigger pulse rate, as the case may be. In practice such also is valid for the asynchronous operation over a short time span with negligible error.

From the curves it will be apparent that the accuracy of the computed values increasingly improves with decreasing sampling time.

The requirement for short sampling times is fulfilled during the asynchronous operation by means of the interrupt logic 46. The reduction, on the average, can amount to approximately 70% in contrast to a fixed measuring cycle.

While there are shown and described present preferred embodiments of the invention, it is to be distinctly understood that the invention is not limited thereto, but may be otherwise variously embodied and practiced within the scope of the following claims. Accordingly,

What I claim is:

1. In a method for the evaluation of signals from an ultrasonic distance measuring system, especially for machine tools, comprising a magnetostrictive conductor along with which there can be displaced a measuring head containing permanent magnet means and by means of which there are transmitted trigger pulses which set a flipflop and lead to echo pulses in the permanent magnet means which reset the flipflop and are received by a stationary receiver at the measuring system, and within a signal transit time (herein referred to as transit time pulse) corresponding to the time between each trigger pulse and the received echo pulse there are counted in a distance counter the pulses generated by a distance oscillator as a measure for the displacement path between the permanent magnet means and a fixed reference point, the improvement which comprises the steps of:

(a) externally triggering the trigger pulses;
(b) counting in addition to the distance oscillator pulses counted during a transit time pulse the pulses of a time oscillator between a first trigger pulse and a second trigger pulse by means of a time counter;
(c) counting by means of a further distance counter the pulses of the distance oscillator during the next transit time pulse and counting by means of a further time counter the pulses of the time oscillator between the second trigger pulse and a third trigger pulse;
(d) computing from the determined counter states:
  (i) the position of the measuring head $$XG_n = NX_n \cdot \Delta x$$

wherein:
n = the last of a plurality of transit time pulses
$XG_n$ = the measured position value after n-transit time pulses
NX = the number of distance counter pulses within a transit time pulse $$\Delta x = \text{distance increment} = V_L/f_W = \frac{\text{ultrasonic propagation velocity}}{\text{distance oscillator frequency}}$$

(ii) the mean velocity of the measuring head $$V_n = \frac{\Delta x}{\Delta t} \cdot \frac{NX_n - NX_{n-1}}{NT_n}$$

wherein:
$V_n$ = the velocity of the measuring head after n-transit time pulses
$\Delta t$ = the time increment = $1/f_T$ = 1/time oscillator frequency
$NT_n$ = number of time counter pulses between the (n−1) and the n-th trigger pulse; and
  (iii) a velocity-correction term for the position $XG_n$ of the measuring head computed during step (i)

$$XV = V_n \cdot T_{Ln} = V_n \cdot (NX_n/fw)$$

wherein: $T_L$ = the time duration of the n-th transit time pulse; and (e) delivering as the evaluation result the velocity-corrected measuring head position $$XA = XG + XV$$

and/or the mean measuring head velocity V.

2. The method as defined in claim 1, wherein the position $XG_n$ of the measuring head is corrected with the following linearity-correction term $XL_{(n)}$ which takes into account the non-linearity of the magnetostrictive conductor:

$$XL_{(n)} = (NX_{(n)} \cdot \Delta x) - X_{REF(n)} + (NX_A \cdot \Delta x)$$

wherein $$\Delta x = \frac{X_{REF}}{\frac{\sum_{i=1}^{i} NX_{E(i)}}{i} - \frac{\sum_{i=1}^{i} NX_{A(i)}}{i}}$$

and wherein:

$XL_{(n)}$ = distance difference between the measurement with a laser interferometer and ultrasonic measuring system at measuring point $P_n$ $NX_A$ = start of the magnetostrictive conductor $NX_E$ = end of the magnetostrictive conductor $X_{REF}$ = distance $\overline{X_A X_E}$ measured by the laser interferometer $NX_{E(i)}$ = number of distance counter pulses with one of i-measurements at the start of the conductor $NX_{A(i)}$ = number of distance counter pulses with one of i-measurements at the end of the conductor $NX_{(n)}$ = number of distance counter pulses measured by the ultrasonic measuring system at the measuring point $P_n$ between $NX_A$ and $NX_E$ $X_{REF(n)}$ = distance measurement at the measuring point $P_n$ of the laser interferometer.

3. The method as defined in claim 1, further including the steps of:

correcting the position $XG_n$ of the measuring head by a temperature-compensation factor $$TFX_{(T)} = NX_{(20^\circ C.)}/NX_{(T)}$$

wherein, there is assumed the value 1 for a temperature of 20° C. and which can be computed ahead of time by means of a number of measurements at other temperatures.

4. The method as defined in claim 1, further including the steps of:

correcting the position $XG_n$ of the measuring head by means of a correction term XO which takes into account the deviation between a null position of the measuring head and the receiver.

5. The method as defined in claim 1, further including the steps of:

outputting as the corrected position XA of the measuring head the function:

$$XA = XG \cdot TFX + XV + XL + XO.$$

6. The method as defined in claim 1, further including the steps of:

following step (c) there are accomplished pulse counts like in step (b) and there is computed from the counter states determined during three counting intervals the acceleration of the measuring head, namely:

$$A_n = 2 \cdot \frac{V_n \, V_{n-1}}{(NT_n + NT_{n-1}) \Delta t}.$$

7. In an arrangement for evaluating signals from an ultrasonic distance measuring system, especially for machine tools, comprising a magnetostrictive conductor along with which there can be displaced a measuring head containing permanent magnet means and by means of which there are transmitted trigger pulses which set a flipflop and lead to echo pulses in the permanent magnet means which reset the flipflop and are received by a stationary receiver at the measuring system, and within a signal transit time (herein referred to as transit time pulse) corresponding to the time between each trigger pulse and the received echo pulse there are counted in a distance counter the pulses generated by a distance oscillator as a measure for the distance between the permanent magnet means and a fixed reference point, the improvement comprising:

a first counter group comprising a distance counter connected with the distance oscillator and a time counter connected with a time oscillator;

a further counter group comprising a further distance counter connected with the distance oscillator and a further time counter connected with the time oscillator;

a counter switching logic connected with the measuring system and controlled by the trigger and echo pulses for switching-in one counter group during each transit time pulse, for stopping the distance counter of such group in the presence of the related echo pulse and the time counter of this group during the next trigger pulse and for the simultaneous switching-in of the other counter group; and a computer connected with the counter switching logic and the counter groups for triggering the trigger pulses, for controlling the counter switching logic and for evaluation of the counter states.

8. The arrangement as defined in claim 7, further including:

a control logic connected with the counter switching logic;

an interface;

the control logic being connected with the computer by means of the interface; and the control logic delivering to the computer the status of a counter group which holds in readiness measuring data.

9. The arrangement as defined in claim 8, further including:

an interrupt logic for interrupting the course of a program of the computer during the evaluation of available measuring data.

* * * * *

UNITED STATES PATENT AND TRADEMARK OFFICE
CERTIFICATE OF CORRECTION

PATENT NO. : 4,510,587
DATED : April 9, 1985
INVENTOR(S) : OTTO SCHNEIDER

It is certified that error appears in the above—identified patent and that said Letters Patent is hereby corrected as shown below:

Column 5, line 36, please delete "to" and insert --the--

Column 5, line 42, please delete "XA = XG . TFX + SV + SL + XO" and insert --XA = XG . TFX + XV + XL + XO--

Column 5, line 47, please delete "viscosity" and insert --velocity"

Column 6, line 29, please delete "elevuation" and insert --evaluation--

Column 7, line 64, please delete "ffom" and insert --from--

Signed and Sealed this

Twenty-fourth Day of September 1985

[SEAL]

Attest:

DONALD J. QUIGG

Attesting Officer

Commissioner of Patents and Trademarks—Designate